United States Patent [19]

Honma

[11] Patent Number: 4,903,195
[45] Date of Patent: Feb. 20, 1990

[54] METHOD FOR CONTROLLING DATA TRANSFER

[75] Inventor: Shigeo Honma, Odawara, Japan

[73] Assignee: Hitachi, Ltd., Tokyo, Japan

[21] Appl. No.: 271,381

[22] Filed: Nov. 14, 1988

Related U.S. Application Data

[63] Continuation of Ser. No. 920,609, Oct. 20, 1986, abandoned.

[30] Foreign Application Priority Data

Oct. 18, 1985 [JP] Japan .............................. 60-231138

[51] Int. Cl.[4] ............................................. G06F 13/00
[52] U.S. Cl. .................................. 364/200; 364/241.2; 364/271.1
[58] Field of Search ...................... 360/51, 72.2, 72.1, 360/78; 364/200, 900

[56] References Cited

U.S. PATENT DOCUMENTS

| 4,067,059 | 1/1978 | Derchak | 364/200 |
|---|---|---|---|
| 4,075,691 | 2/1978 | Davis et al. | 364/200 |
| 4,183,084 | 1/1980 | Lawson | 364/200 |
| 4,207,609 | 6/1980 | Luiz et al. | 364/200 |
| 4,215,400 | 7/1980 | Denko | 364/200 |
| 4,420,807 | 12/1983 | Nolta et al. | 364/200 |
| 4,482,982 | 11/1984 | Yu et al. | 364/900 |
| 4,543,626 | 9/1985 | Bean et al. | 364/200 |

*Primary Examiner*—David Y. Eng
*Attorney, Agent, or Firm*—Antonelli, Terry & Wands

[57] ABSTRACT

The invention relates to a method for controlling the data transfer between the rotary memory device such as a disk drive apparatus and the central processing unit. In this invention, after positioning to the read start location designated by a command from the central processing unit for determining the read start location, prefetch of the buffer operation is started without waiting for the read command subsequent to that command.

6 Claims, 3 Drawing Sheets

FIG. 3

DEFINE EXTENT ------- OPERABLE RANGE, etc.

LOCATE ------------ { POSITIONING INFORMATION  
AVERAGE RECORD LENGTH F  
NUMBER OF RECORDS N

READ CKD --------- READING OF RECORD 1

READ CKD --------- READING OF RECORD 2

READ CKD --------- READING OF RECORD 3

METHOD FOR CONTROLLING DATA TRANSFER

This application is a continuation of application Ser. No. 06/920,609, filed on Oct. 20, 1986 now abandoned.

BACKGROUND OF THE INVENTION

The present invention relates to a data transfer control method for controlling the data transfer between a rotary memory device such as, for example, a disk drive apparatus and a central processing unit by commands from the central processing unit.

Hitherto, there has been known a disk control apparatus for transferring the read data of a disk drive apparatus for a central processing unit, which disk control apparatus controls the disk drive apparatus such that positioning operation to a desired record is started after receiving the command (LOCATE command) to instruct the read start position and the total number of bytes to be transferred by the read command chained to the LOCATE command, but the loading of data into the data buffer is started only when the read command which is next to the LOCATE command in command chain is received. However, in this method, if the interruption signal is not accepted by the channel, the disk control apparatus must then wait for the next rotation, thereby resulting in low efficiency. In particular, if the state in which the interruption signal cannot be accepted continues for a time longer than a predetermined period of time, an error such as time-over or the like will occur. An attempt for overcoming this problem is disclosed in, for example, JP-A-55-34783. However, according to this method, there is the prerequisite such that only after the positioning completion interruption has not accepted more than a predetermined number of times, the completion interruption is always signaled. Therefore, there exists a state in which the completion interruption is not received a few times.

In the case where the data transfer speed on the side of the central processing unit is faster than that of the external memory device, if the loading of the data into the buffer is started after the reception of the read command which is next to the LOCATE command in the command chain, the data transfer on the side of the CPU and the data transfer on the side of the external memory device will simultaneously start. However, in this case, since the data transfer speed on the side of the CPU is faster, the CPU must wait until the desired record is fully stored into the buffer or must execute the data transfer in accordance with the data transfer speed on the side of the external memory device. Thus, the connection time with the CPU is prolonged beyond what it is needed.

SUMMARY OF THE INVENTION

It is an object of the present invention to solve the drawbacks to the conventional technology and to provide a data transfer control method having a high throughput.

According to one aspect of the invention, pre-fetch operation of the buffer is started after the head having reached a predetermined location on a track and prior to receiving the subsequent read command.

The LOCATE command specifies the positioning information such as cylinder, head, sector, record number, and the like of the external memory device and the like to the start reading operation. It also specifies the average length of one record and the number of records to be continuously read. Therefore, after having detected that the head reached the predetermined location on the track, pre-fetch operation can be started without receiving the read command which is next to the LOCATE command in the command chain. Once the pre-fetch operation has been started, the interruption signal indicating the completion of detection that the head reached the predetermined location on the track may be signaled at any time. Namely, by storing into the buffer the data from the position which is requested by the CPU, even if the interruption signal cannot be accepted to the channel, there is no need to wait for the next rotation.

The timing to start issuing the completion interruption is determined as follows. Namely, in the case where the data transfer speed on the side of the CPU is slow and that on the side of the external memory device is fast, the highest efficiency can be obtained by starting issuing the completion interruption simultaneously with the completion of detection that the predetermined location was reached by the head, namely, simultaneously with the start of pre-fetch. On the contrary, in the case where the data transfer speed on the CPU side is fast and that of the external memory device is slow, the highest efficiency can be obtained by starting issuing of the completion interruption after the elapse of time T since pre-fetch had been started. The value of T is determined by the data transfer speeds of the CPU side and external memory device and by the total number of transfer bytes to be processed by the read command subsequent to the LOCATE command.

BRIEF DESCRIPTION OF THE DRAWINGS

FIG. 3 is a diagram showing an example of a command chain;

DESCRIPTION OF THE PREFERRED EMBODIMENTS

Figure 1:
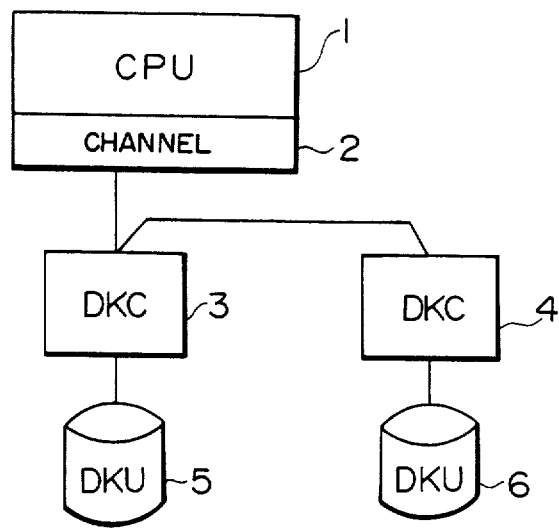
FIG. 1 is a system arrangement diagram applicable to the present invention.

An embodiment of the present invention will now be described hereinbelow with respect to an example of an electronic computer system comprising a central processing unit (CPU) 1 including a channel 2, disk control apparatuses (DKC) 3 and 4, and disk drive apparatuses (DKU) 5 and 6 as shown in FIG. 1.

Figure 2:
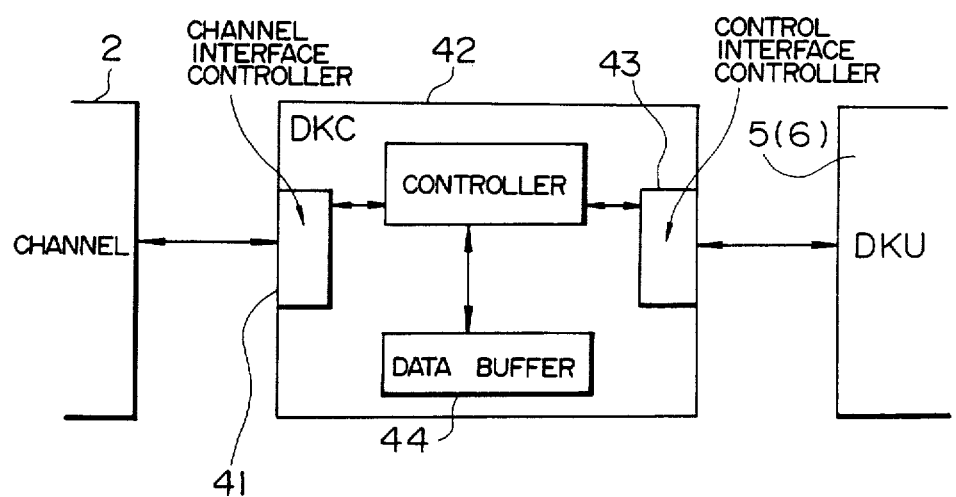
FIG. 2 is an internal arrangement diagram of a DKC in FIG. 1.

FIG. 2 shows an internal arrangement of the DKC. A control unit 42 includes a microprocessor and controls a channel interface control unit 41, a control interface control unit 43, and a data buffer 44 on the basis of the commands of the microprogram. The control unit 42 performs the data transfer between the channel 2 and the DKU through the data buffer 44.

FIG. 3 shows an example of a command chain which is received by the DKC from the channel 2. The DEFINE EXTENT command specifies an operable range on the DKU. The LOCATE command specifies the positioning information such as cylinder, head sector number, record number, and the like of the DKU to start the reading operation. It also specifies the average length F of one record, and the number N of records to be continuously read. The READ CKD command reads one physical record. Assuming that the lengths of the record 1 ($R_1$), record 2 ($R_2$), and record 3 ($R_3$) are equal and that each of these records has the length of F bytes, the total number of bytes to be transferred by the command chain is $F \times N = L$ bytes.

Figure 4:
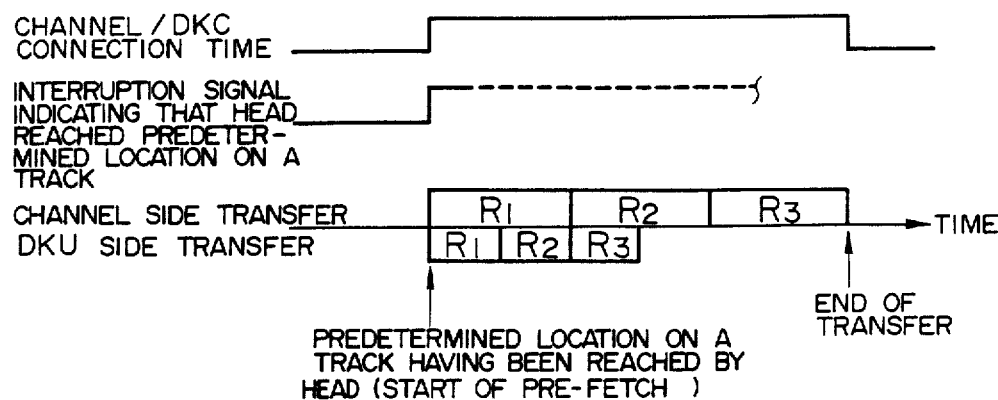
FIG. 4 is a diagram for explaining the data transfer in the case where a disk drive apparatus (DKU) has the transfer speed which is twice as fast as that of the channel.

FIG. 4 shows the operation of the DKC 4 when the command chain is executed by the electronic computer system in which, for example, the DKU has the transfer speed which is twice as fast as that of the channel. After the DKC 4 receives the LOCATE command, it instructs to seek the cylinder, head, and the sector number designated for the DKU 6 and to execute the SET SECTOR operation. When the DKC 4 detects that the head reached the desired position, it promptly starts storing the data into the data buffer 44 and simultaneously raises the interruption signal representing that the head reached the predetermined location to the channel 2. When the interruption signal is immediately accepted by the channel 2, the channel 2 issues the first READ CKD command which is immediately next to the LOCATE command in the command chain, thereby allowing the transfer of the data in the data buffer 44 to the channel 2 to be started. In this case, since the DKU has the transfer speed which is twice as fast as that of the channel 2, the DKC 4 finishes the operation up to the third READ CKD command by spending the time which is about twice as long as the time as compared with the case of the data transfer with the DKU. On the other hand, even in the state in which the data is being transferred between the channel 2 and the DKC 3 and in which the interruption signal from the DKC 4 cannot be accepted, the DKC 4 continuously raises the interruption signal and also continues the pre-fetch of the data buffer 44. Therefore, the DKC 4 doesn't need to wait until the desired sector comes but it is sufficient for the DKC 4 to wait for the acceptance of the interruption signal by the channel 2. Thus, the useless time can be eliminated. If the interruption signal is not accepted, pre-fetch is finished when either one of the conditions that the data buffer 44 having the limited length is filled with the data and the data as much as the total number of transfer bytes designated by the LOCATE command has been fully stored is satisfied.

Figure 5:
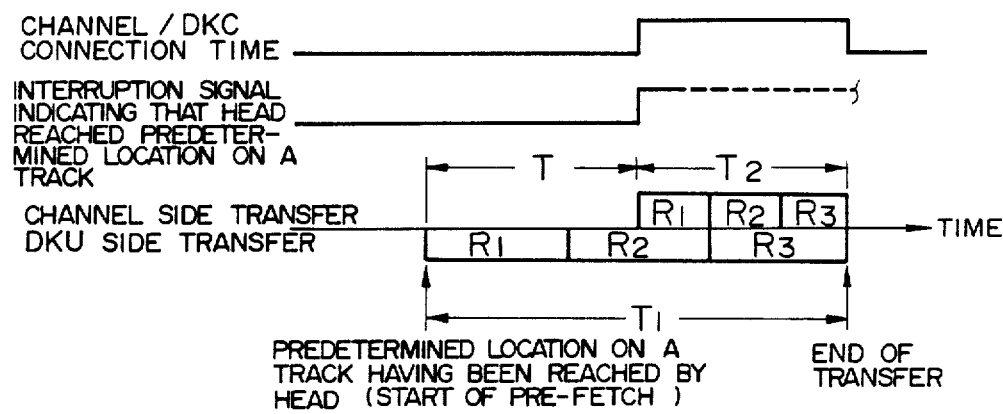
FIG. 5 is a diagram for explaining the data transfer in the case where the channel has the transfer speed which is twice as fast as that of the DKU.

Next, FIG. 5 shows the operation of the DKC 4 when the command chain was executed by the electronic computer system in which, for example, the channel 2 has the transfer speed which is twice as fast as that of the DKU. In this case, after the desired sector comes, pre-fetch of the data buffer 44 is started. However, the interruption signal cannot be issued to the channel 2. The interruption signal is issued following the elapse of time T after the buffering of pre-fetch had been started. In this case, T satisfies the following expressions.

$$T = T_1 - T_2$$

$$BT_1 = AT_2$$

Therefore, $T = (A - B)T_1/A$

Since $A = 2B$, $$T = T_1/2$$

$T_1$: the period of time which is required for the DKU to transfer the data of the length of L bytes $T_2$: the period of time which is required for the channel to transfer the data of the length of L bytes A: the transfer speed of the channel B: the transfer speed of the DKU Namely, if the interruption signal is issued after the DKU finished buffering the data of the length of L/2 bytes, the data transfer on the DKU side and the data transfer on the channel side can be simultaneously finished. Thus, the connecting time of the channel 2 and the DKC can be minimized. However, even in the case where the interruption signal cannot be promptly received to the channel 2, the interruption signal is continuously issued until it is accepted by the channel 2, which is similar to the case in FIG. 4.

According to the present invention, it is possible to realize the data transfer control method having a high throughput in which the drawbacks encountered in the conventional apparatus can be solved.

I claim:

1. In a data transfer control method for controlling data transfer between a rotary memory device and a central processing unit, wherein after issuing to said rotary memory device a positioning command to position said memory device to a location in which a desired data is recorded, coupling between said central processing unit and said rotary memory device becomes temporarily interrupted and upon reception of a positioning completion interruption signal from said rotary memory device, said central processing unit coupling with said rotary memory device is restored wherein it then issues a next read command, said method comprising the steps of:

positioning said rotary memory device to a read start location designated by a command from said central processing unit for determining a read start location;

starting a read operation of data stored in said rotary memory device and a write operation of the data read out of said rotary memory device into a buffer even when said coupling between said central processing unit and said rotary memory device has been temporarily interrupted and without waiting for a read command subsequent to said command for determining a read start location;

generating an interruption signal to request said central processing unit to output said read command, wherein said interruption signal is generated at a point in time which is based upon the relative speed of data transfer at the rotary memory device and data transfer at the central processing unit including generating said interruption signal simultaneously with the start of said read and write operations when the data transfer speed at the central processing unit is not greater than that at the rotary memory device; and transferring the data in said buffer to the central processing unit after the reception of said read command.

2. In a data transfer control method for controlling data transfer between a rotary memory device and a central processing unit, wherein after issuing to said rotary memory device a positioning command to position said rotary memory device to a location in which a desired data is recorded, coupling between said central processing unit and said rotary memory device becomes temporarily interrupted and upon reception of a positioning completion interruption signal from said rotary memory device, said central processing unit coupling with said rotary memory device is restored wherein it then issues a next read command, said method comprising the steps of:

positioning said rotary memory device to a read start location determined by a command from said central processing unit for determining a read start location;

starting a read operation of data stored in said rotary memory device and a write operation of the data read out of said rotary memory device into a buffer even when said coupling between said central processing unit and said rotary memory device has been temporarily interrupted and without waiting for a read command subsequent to said command for determining a read start location;

generating an interruption signal to request said central processing unit to output said read command, wherein said interruption signal is generated at a point in time which is based upon the relative speed of data transfer at the rotary memory device and data transfer at the central processing unit including generating said interruption signal a predetermined time T after the start of said read and write operations when the data transfer speed at the central processing unit is greater than that at the rotary memory device, said time T being defined by an equation $(A-B)T_1/A$, where $T_1$ is the period of time which is required for the rotary memory device to transfer the data of a certain length, A is the data transfer speed at the central processing unit and B is the data transfer speed at the rotary memory device; and transferring the data in said buffer to the central processing unit after the reception of said read command.

3. In a data transfer control method for controlling data transfer between a rotary memory device and a central processing unit, wherein after issuing to said rotary memory device a positioning command via a controlling circuit in a control interface unit so as to position said rotary memory device to a location in which a desired data is recorded, coupling between said central processing unit and said rotary memory device through said controlling circuit becomes temporarily interrupted and upon reception of a positioning completion interruption signal from said rotary memory device via said control interface unit, said central processing unit coupling with said rotary memory device is restored wherein it then issues a next read command, said method comprising the steps of:

positioning said rotary memory device to a read start location designated by a command from said central processing unit through said controlling circuit for determining a read start location;

starting a read operation of data stored in said rotary memory device and a write operation of the data read out of said rotary memory device into a buffer located in said control interface unit even when said coupling between said central processing unit with both said control interface unit and said rotary memory device has been temporarily interrupted and without waiting for a read command subsequent to said command for determining a read start location;

generating an interruption signal through said controlling circuit to request said central processing unit to output said read command, wherein said interruption signal is generated at a point in time which is based upon the relative speed of data transfer at the rotary memory device and data transfer at the central processing unit including generating said interruption signal simultaneously with the start of said read and write operations when the data transfer speed at the central processing unit is not greater than that at the rotary memory device; and transferring the data in said buffer to the central processing unit after the reception of said read command at said controlling circuit of said control interface unit.

4. In a data transfer control method for controlling data transfer between a rotary memory device and a central processing unit, wherein after issuing to said rotary memory device a positioning command via a controlling circuit in a control interface unit so as to position said rotary memory device to a location in which a desired data is recorded, coupling between said central processing unit and said rotary memory device through said controlling circuit becomes temporarily interrupted and upon reception of a positioning completion interruption signal from said rotary memory device via said control interface unit, said central processing unit coupling with said rotary memory device is restored wherein it then issues a next read command, said method comprising the steps of:

positioning said rotary memory device to a read start location determined by a command from said central processing unit through said controlling circuit for determining a read start location;

starting a read operation of data stored in said rotary memory device and a write operation of the data read out of said rotary memory device into a buffer located in said control interface unit even when said coupling between said central processing unit with both said control interface unit and said rotary memory device has been temporarily interrupted and without waiting for a read command subsequent to said command for determining a read start location;

generating an interruption signal through said controlling circuit to request said central processing unit to output said read command, wherein said interruption signal is generated at a point in time which is based upon the relative speed of data transfer at the rotary memory device and data transfer at the central processing unit including generating said interruption signal a predetermined time T after the start of said read and write operations when the data transfer speed at the central processing unit is greater than that at the rotary memory device, said time T being defined by an equation $(A-B)T_1/A$, where $T_1$ is the period of time which is required for the rotary memory device to transfer the data of a certain length, A is the data transfer speed at the central processing unit and B is the data transfer speed at the rotary memory device; and transferring the data in said buffer to the central processing unit after the reception of said read command at said controlling circuit of said control interface unit.

5. A data transfer control method for controlling data transfer between a rotary memory device having at least one track and a central processing unit, wherein after issuing to said rotary memory device a positioning command via a controlling circuit in a control interface unit so as to position said rotary memory device to a location in which a desired data is recorded, coupling between said central processing unit and said rotary memory device through said controlling circuit becomes temporarily interrupted and upon reception of a positioning completion interruption signal from said rotary memory device via said control interface unit, said central processing unit coupling with said rotary memory device is restored wherein it then issues a next read command, said method comprising the steps of:

positioning said rotary memory device to a read start location designated by a command from said central processing unit through said controlling circuit for determining a read start location;

starting a read operation of data stored in said rotary memory device and a write operation of the data read out of said rotary memory device into a buffer located in said control interface unit even when said coupling between said central processing unit with both said control interface unit and said rotary memory device has been temporarily interrupted without waiting for a read command from said central processing unit to said controlling circuit subsequent to said command for determining a read start location;

generating an interruption signal through said controlling circuit at a point in time based upon the relative speed of data transfer of said rotary memory device and said central processing unit to request said central processing unit to output said read command, including generating said interruption signal simultaneously with the start of said read and write operations when the data transfer speed at the central processing unit is not greater than that at the rotary memory device; and transferring the data in said buffer to the central processing unit after the reception of said read command by said controlling circuit of said control interface unit.

6. A data transfer control method for controlling data transfer between a rotary memory device having at least one track and a central processing unit, wherein after issuing to said rotary memory device a positioning command via a controlling circuit in a control interface unit so as to position said rotary memory device to a location in which a desired data is recorded, coupling between said central processing unit and said rotary memory device through said controlling circuit becomes temporarily interrupted and upon reception of a positioning completion interruption signal from said rotary memory device via said control interface unit, said central processing unit coupling with said rotary memory device is restored wherein it then issues a next read command, said method comprising the steps of:

positioning said rotary memory device to a read start location determined by a command from said central processing unit through said controlling circuit for determining a read start location;

starting a read operation of data stored in said rotary memory device and a write operation of the data read out of said rotary memory device into a buffer located in said control interface unit even when said coupling between said central processing unit with both said control interface unit and said rotary memory device has been temporarily interrupted without waiting for a read command from said central processing unit to said controlling circuit subsequent to said command for determining a read start location;

generating an interruption signal through said controlling circuit at a point in time based upon the relative speed of data transfer of said rotary memory device and said central processing unit to request said central processing unit to output said read command, including generating said interruption signal a predetermined time T after the start of said read and write operations when the data transfer speed at the central processing unit is greater than that at the rotary memory device, said time T being defined by an equation $(A-B)T_1/A$, where $T_1$ is the period of time which is required for the rotary memory device to transfer the data of a certain length, A is the data transfer speed at the central processing unit and B is the data transfer speed at the rotary memory device; and transferring the data in said buffer to the central processing unit after the reception of said read command by said controlling circuit of said control interface unit.

* * * * *